US006490516B1

United States Patent
Henneken et al.

(10) Patent No.: US 6,490,516 B1
(45) Date of Patent: Dec. 3, 2002

(54) METHOD FOR CONTROLLING THE AUTOMATIC GEARBOX OF A MOTOR VEHICLE

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/807,778

(22) PCT Filed: Oct. 16, 1999

(86) PCT No.: PCT/EP99/07872

§ 371 (c)(1),
(2), (4) Date: Apr. 18, 2001

(87) PCT Pub. No.: WO00/24604

PCT Pub. Date: May 4, 2000

(30) Foreign Application Priority Data

Oct. 24, 1998 (DE) .......................................... 198 49 057

(51) Int. Cl.$^7$ ........................ B60K 41/26; B60K 41/06; F16H 59/04
(52) U.S. Cl. ............................ 701/51; 701/56; 477/45; 477/46
(58) Field of Search .............................. 701/51, 56, 57, 701/62; 477/45, 46, 48, 94, 96, 158, 161, 97, 125

(56) References Cited

U.S. PATENT DOCUMENTS 4,454,428 A * 6/1984 Kimmel et al. ............ 290/40 R
5,390,117 A   2/1995 Graf et al. ................ 364/424.1
5,527,235 A * 6/1996 Kuroda et al. ................ 477/94
5,573,475 A * 11/1996 Sakakiyama et al. ......... 477/94
5,672,137 A * 9/1997 Adachi et al. ................. 477/45
5,921,889 A   7/1999 Nozaki et al. ............... 477/158

FOREIGN PATENT DOCUMENTS

DE    34 35 869 A1   4/1986
DE    197 43 725 A1  4/1998
DE    197 49 132 A1  5/1998
EP    0 576 703 A1   1/1994
EP    0 583 610 B1   2/1994
EP    0 795 700 A2   9/1997

OTHER PUBLICATIONS

Welter, Andreas, Rudolf Kragl, Harald Ender and Harry Martin. "Die Adaptive Getriebesteuerung fur die Automatikgetriebe der BMW Fahrzeuge mit Zwölfzylindermotor", *ATZ Automobiltechnische Zeitschrift* 94 (1992 9: pp. 428–438.

* cited by examiner

*Primary Examiner*—Tan Q. Nguyen
*Assistant Examiner*—Dalena Tran
(74) *Attorney, Agent, or Firm*—Davis & Bujold, P.L.L.C.

(57) ABSTRACT

In a method for controlling an automatic transmission of a motor vehicle having an electronic gear control (EGS) that continuously exchanges signals with a vehicle dynamics regulator (FDR), the electronic gear control (EGS) receives signals (SL) of an anti-slip control system (ASC) and/or of an anti-blocking system (ABS). In addition the vehicle dynamics regulator (FDR) is functionally linked with a dynamic stabilizer (DS) which in predefined operating situations issues a signal (SV) to the electronic gear control (EGS) via the vehicle dynamics control (FDR), which signal is processed simultaneously with the incoming signals (SL) from the anti-slip control system (ASC) and/or the anti-blocking system (ABS).

16 Claims, 1 Drawing Sheet

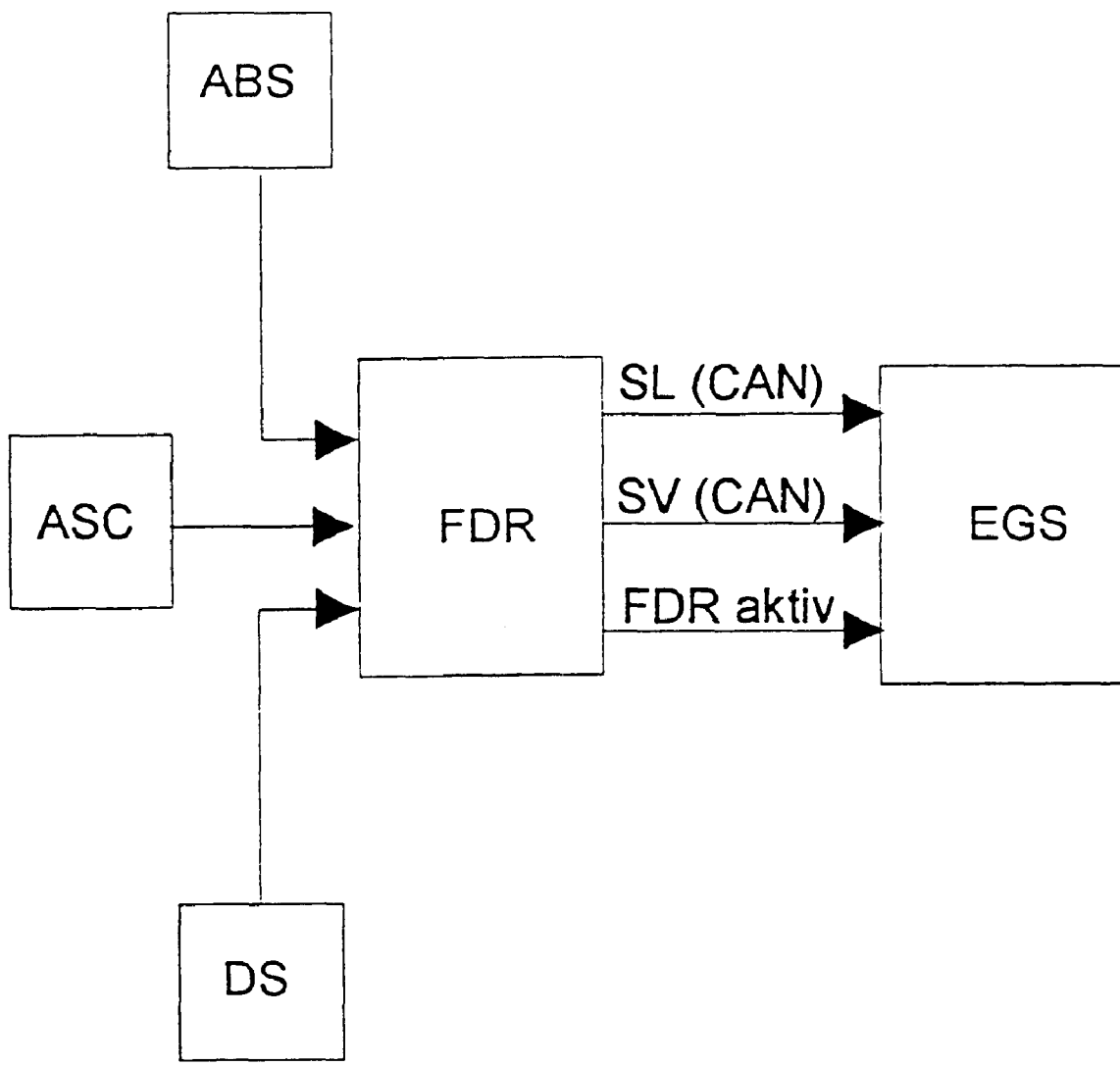

METHOD FOR CONTROLLING THE AUTOMATIC GEARBOX OF A MOTOR VEHICLE

FIELD OF THE INVENTION

According to the kind defined in detail in the preamble of claim 1, the invention relates to a method for control of an automatic transmission of a motor vehicle having an electronic gear control which continuously exchanges signals with at least one vehicle dynamics regulator.

BACKGROUND OF THE INVENTION

The use of the intelligence in electronics is illustrated in motor vehicles with automatic transmissions by application of an electronic gear control (EGS) with which criteria known to be relevant for the customers, such as driving comfort and driveability and also criteria relevant to safety, are met to a great extent.

For automatic selection of shift program stored in the electronic gear control which describes, for ex., a known driver type recognition, an environment recognition, a driving situation recognition, or a manual engagement recognition, known from the publication "ATZ Automobiltechnische Zeitschrift" 94 (1992) and for gear selection according to situations, the electronic gear control continuously communicates with other control units and computers of different aggregates via a CAN data bus (Controlled Area Network).

It is known from the practice that the electronic gear control is linked with a vehicle dynamics regulator (FDR) which coordinates and assists with different regulation systems in the braking system and in the drive train. Belonging to the output signals of this regulation system are, for ex., an anti-blocking system (ABS) against blockage of the wheels when braking, an anti-slip control system (ASC) against spinning of the wheels when driving and an engine management that regulates the engagement in the engine control, are issued via the vehicle dynamics regulator to the electronic gear control.

The operating mode of an anti-slip control system has been disclosed, for ex., in DE 34 35 869 A1 and EP 0 583 610 B1.

In these input slip regulation systems known already, in the case of a spinning tendency at least one driven wheel reduces the engine torque and, at the same time, produces a control signal which is passed on to the electronic gear control of an automatic transmission at the start of the engine torque reduction. On the strength of that the electronic gear control introduces a shift to the higher gear.

In addition, in EP 0 583 610 B1 has in addition been described a so-called "winter program" in which, according to a regulating signal of the anti-slip control system, a shift program is started with output-torque reducing shift characteristic lines until an interruption criterion is met.

Together with a vehicle dynamic control with an anti-slip control system and an anti-blocking system, a special program showing a dynamic stabilizer (DS) is known from the practice. The system brakes certain wheels, for ex., upon a critical transverse acceleration of the vehicle, in order to prevent a lateral jack-knifing of the vehicle.

However, the gear control methods known already prove insufficient in some special operating situations.

One of these special operating situation occurs, for ex., when the vehicle dynamics control, on the basis of a signal of the anti-slip control system or of the anti-blocking system, calls for a special driving program with gear shifts in the electronic gear control while a situation is detected by the dynamic stabilizer which requires prevention of the gear shift.

As result of the insufficient assistance of the dynamics stabilizer by the electronic gear control, it is possible for load changes to be carried out which impair the driving comfort and under certain circumstances further destabilize the existing insecure driving state.

The problem on which this invention is based is to make available a method for control of an automatic transmission having an electronic gear control which communicates with a vehicle dynamics control and with a view to better driving comfort and increased safety, can equally react to a signal of an anti-slip control system or of an anti-blocking system, the same as to a signal of a dynamic stabilizer.

SUMMARY OF THE INVENTION

By means of the inventive method in which the dynamic stabilizer DS is integrated in the regulation system of the vehicle dynamics regulator FDR and a signal of the dynamic stabilizer DS is processed simultaneously with a signal of the anti-slip control system ASC and/or of the anti-blocking system ABS entering into the electronic gear control EGS, the electronic gear control reacts supportingly in the same manner to the dynamic stabilizer and to the anti-slip control system or anti-blocking system.

The vehicle dynamics regulator offers during slip detection for ex., a change to a special drive program which contains all the shift characteristic lines and converter characteristic lines for a drive mode preventive of slip. The output-put torque reducing shift characteristic lines of this drive program should prevent, or at least reduce, slip on a road having a low frictional value.

Besides, the vehicle dynamics regulator FDR offers the possibility of triggering shifting preventions when thereby the dynamic stabilizer DS is assisted.

When the vehicle dynamics regulator FDR detects during a dynamic stabilization DS that a certain criterion such as, for ex., too high a transverse acceleration has been met, the electronic gear control is engaged, via a corresponding signal, for preventing gear shifts and if needed a deceleration of certain wheels is called for in order to ensure stability of the vehicle.

Since via a function stored in the electronic gear EGS, in addition to the processing of the signal of the anti-slip control system ASC or of the anti-blocking system ABS, it is now at the same time reacted also to a signal of the vehicle dynamics regulator FDR to prevent gear shifts and on the gear side the special conditions of the vehicle dynamics control are taken into account, with the inventive method this represents a gear-assisted dynamic stabilization for the vehicle.

BRIEF DESCRIPTION OF THE DRAWING

The invention will now be described, by way of example, with reference to the accompanying drawings in which:

FIG. 1 is shown in block diagram of the present transmission control system.

DETAILED DESCRIPTION OF THE INVENTION

In the single figure, a method for control of an automatic transmission of a motor vehicle having an electronic gear control EGS which, among other things, exchanges signals at least with one digital engine electronic system (not shown) and a vehicle dynamic control FDR is very diagrammatically sketched.

The electronic gear control EGS functionally linked with the vehicle dynamics regulator FDR, receives, via the vehicle dynamics, regulator FDR signals of an anti-slip control system ASC, of an anti-blocking system ABS and of a dynamic stabilizer DS, the dynamic stabilizer DS issuing in predefined operating situations a signal SV to prevent gear shifts to the electronic gear control EGS.

That demand for a state with shift prevention on the part of the dynamic stabilizer DS is processed in the electronic gear control EGS simultaneously with signals of the anti-slip control system ASC and of the anti-blocking system ABS demanding a gear shift and a drive program selected in accordance with the signals of the dynamic stabilizer DS, of the anti-slip control system ASC and of the anti-blocking system ABS engages in the digital engine electronics a braking system and a drive train control in a manner such as to prevent a lateral jack-knifing of the vehicle.

When the signal of the anti-slip control system ASC indicates that there is a slip SL and a gear change is required, a drive program for driving on a road with low frictional value is activated, and the gear changes is controlled according to output-torque reducing shift characteristic lines.

Such a special program introduced by the electronic gear control EGS, upon a corresponding signal of the anti-slip control system ASC, is also called a "winter drive program".

The signals simultaneously entering in the electronic gear control EGS are fed to an OR function with an established dominance, as a rule the signal SV for shift prevention being dominant.

The signal SL of the anti-slip control system ASC indicative of slip is, to the contrary dominant when an output rotational speed is detected that is lower than a limit rotational speed. The drive program for driving on roads with low frictional value therefore has priority only at low speeds, since at a high output rotational speed again what matters is to keep the vehicle state as constant as possible, that is, to prevent gear shifts.

The signal SV for preventing gear shifts is issued by the vehicle dynamics control FDR to the electronic gear control EGS when the dynamic stabilizer DS is activated. This is the case when the dynamic stabilizer DS detects a transverse acceleration or a difference between rotational speeds of individual wheels of the vehicle which is above a given limit value.

In the instant case, upon receiving the signal SV for preventing gear shifts, the electronic gear control EGS generally triggers a gear shift prevention.

However, in other embodiments it is also possible that a signal which allows a differentiation between an upshift prevention and a downshift prevention be available and is then separately triggered in the electronic gear control EGS.

The state of prevention of gear shifts, based on a signal issued by the dynamic stabilizer DS, is maintained as long as the signal SV is received and the vehicle dynamics regulator FDR is in a regulating phase. At the same time, the engine rotational speed at the same time must still be within an admissible range.

As additional termination criteria, also the detection of manual engagement such as a manual shift by the driver in a tip operation or an actuation of a selector key to "SPORT" or the exceeding of a predefined maximum delay time can obviously be complementarily or alternatively provided.

When the drive program for driving on a road with a low frictional value, that is, the "winter drive program", is active, one of several programs for a special case is started, in the instant embodiment a drive program dependent on road gradient like uphill, level, or downhill being started.

The winter drive program remains active only on the condition that the electronic gear control EGS receives a signal from the vehicle dynamics regulator FDR that it is in a regulating phase and thus active together with the gear change inquiry of the anti-slip control system ASC.

In case the vehicle dynamics control FDR is not connected, it is thus prevented that a special drive program be or remain activated despite a manual disengagement or a failure of the vehicle dynamics control FDR.

When the vehicle dynamics control FDR is active, a driver type recognition stored in an operating program of the electronic gear control EGS as shift program is always deactivated in order to prevent unrealistic values of the driver type recognition determined in the special drive program, here the winter drive program.

The winter drive program obviously can also be terminated by tip operation, that is, manual shifting by the driver, or by actuating a selector key such as pressing a "SPORT" key.

When abandoning the winter drive program activated by the vehicle dynamics control FDR, a change is made to a predetermined drive program like a drive program for economic driving.

| Nomenclature | |
|---|---|
| ABS | anti-blocking system |
| ASC | anti-slip control system |
| CAN | (controller area network) data bus signal\ |
| DME | digital engine electronics |
| DS | dynamic stabilizer |
| EGS | electronic gear control |
| FDR | vehicle dynamics regulator |
| SL | signal to indicate a slip |
| SV | signal to prevent gear shifts |

What is claimed is:

1. A method for controlling an automatic transmission of a motor vehicle having an electronic gear control (EGS) which continuously exchanges signals with a vehicle dynamics control (FDR), the vehicle dynamics control (FDR) being an electronic signal processor which receives input signals from at least one of an anti-slip control system (ASC) and an anti-blocking system (ABS), the vehicle dynamics control generates corresponding output signals to control the electronic gear control (EGS), the method comprising the steps of:

functionally linking the vehicle dynamics control (FDR) with a dynamic stabilizer (DS);

issuing to the electronic gear control (EGS), via the vehicle dynamics control (FDR) a signal for preventing gear shifts based on the dynamic stabilizer (DS) detecting predefined operating situations; and simultaneously processing in the electronic gear control (EGS) the signal for preventing gear shifts, issued by the dynamic stabilizer (DS), with at least one of an incoming signal (SL) from the anti-slip control system (ASC) and an incoming signal from the anti-blocking system (ABS).

2. The method according to claim 1, further comprising the step of processing signals, which simultaneously enter the electronic gear control (EGS) in an OR function according to established dominance, on one side, at least one of a signal (SL) from the anti-slip control system (ASC) and a signal from the anti-blocking system (ABS) demanding a gear shift; and, on the other side, a signal (SV) from the dynamic stabilizer (DS) demanding a gear shift prevention.

3. The method according to claim 1, further comprising the step of issuing, via the vehicle dynamics control (FDR) to the electronic gear control (EGS), the signal (SV) for preventing gear shifts when the dynamic stabilizer (DS) is activated.

4. The method according to claim 1, further comprising the step of detecting, via the electronic gear control (EGS), the signal (SV) for preventing gear shifts as one of a general shift prevention, an upshift prevention and a downshift prevention.

5. The method according to claim 1, further comprising the step of terminating a state of prevention of gear shifts, as result of the signal (SV) issued by the dynamic stabilizer (DS), when an engine rotational speed one of exceeds and falls below a limit value.

6. The method according to claim 1, further comprising the step of activating the dynamic stabilizer (DS) when one of a transverse acceleration and a difference between rotational speeds of individual wheels of the vehicle exists which is detected above a predetermined limit value.

7. The method according to claim 1, further comprising the step of activating, via the electronic gear control (EGS), a drive program for driving on a road with a low frictional value, upon a signal (SL) of the anti-slip control system (ASC) demanding a gear shift that a slip exists, and controlling the gear change according to output-torque reducing shift characteristic lines.

8. The method according to claim 7, further comprising the step of rending the signal (SL) from the anti-slip control system (ASC), that slip exists, dominant in relation to the signal (SV) of the dynamic stabilizer (DS) requiring shift prevention, and starting the drive program for driving at a low friction value when an output rotational speed is detected lower than a limit rotational speed.

9. The method according to claim 7, further comprising the step of starting, when activating a drive program for driving on a road with a low frictional value, a special drive program according to a road gradient.

10. The method according to claim 7, further comprising the step of changing to a predetermined drive program when abandoning the drive program activated by the vehicle dynamics control for driving on a road with a low frictional value.

11. The method according to claim 1, further comprising the step of selecting a drive program according to signals (SL, SV) from at least one of the dynamic stabilizer (DS), from the anti-slip control system (ASC), and from of the anti-blocking system (ABS) which engages one of the digital engine electronics (DME) and/or a braking system and/or a drive train control, in a manner to prevent a lateral jack-knifing of the vehicle.

12. The method according to claim 1, further comprising the step of carrying out a drive program according to the signals (SL, SV) from the anti-slip control system (ASC) from the anti-blocking system (ABS) and/or of the dynamic stabilizer (DS), only when the vehicle dynamics control (FDR) is detected as being active by the electronic gear control (EGS).

13. The method according to claim 1, further comprising the step of deactivating a driver type recognition, stored in an operating program of the electronic gear control (EGS) as a shift program, when the vehicle dynamics control (FDR) is detected as being active.

14. The method according to claim 1, further comprising the step of terminating a state of prevention of gear shifts, as result of the signal (SV) issued by the dynamic stabilizer (DS), when one of a manual engagement, established as termination criterion, is detected and a predefined maximum delay time is exceeded.

15. A method for controlling an automatic transmission of a motor vehicle having an electronic gear control (EGS) which continuously exchanges signals with a vehicle dynamics control (FDR), the vehicle dynamics control (FDR) being an electronic signal processor which receives input signals from at least one of an anti-slip control system (ASC) and an anti-blocking system (ABS), the vehicle dynamics control generates corresponding output signals to control the electronic gear control (EGS), the method comprising the steps of:

functionally linking the vehicle dynamics control (FDR) with a dynamic stabilizer (DS);

issuing to the electronic gear control (EGS), via the vehicle dynamics control (FDR) a signal for preventing gear shifts based on the dynamic stabilizer (DS) detecting predefined operating situations; and simultaneously processing in the electronic gear control (EGS) the signal for preventing gear shifts, issued by the dynamic stabilizer (DS), with at least one of an incoming signal (SL) from the anti-slip control system (ASC) and an incoming signal from the anti-blocking system (ABS);

processing signals, which simultaneously enter the electronic gear control (EGS) in an OR function according to established dominance, on one side, at least one of a signal (SL) from the anti-slip control system (ASC) and a signal from the anti-blocking system (ABS) demanding a gear shift; and, on the other side, a signal (SV) from the dynamic stabilizer (DS) demanding a gear shift prevention.

16. A method for controlling an automatic transmission of a motor vehicle having an electronic gear control (EGS) which continuously exchanges signals with a vehicle dynamics control (FDR), the vehicle dynamics control (FDR) being an electronic signal processor which receives input signals from at least one of an anti-slip control system (ASC) and an anti-blocking system (ABS), the vehicle dynamics control generates corresponding output signals to control the electronic gear control (EGS), the method comprising the steps of:

functionally linking the vehicle dynamics control (FDR) with a dynamic stabilizer (DS);

issuing to the electronic gear control (EGS), via the vehicle dynamics control (FDR) a signal for preventing gear shifts based on the dynamic stabilizer (DS) detecting predefined operating situations; and simultaneously processing in the electronic gear control (EGS) the signal for preventing gear shifts, with at least one of an incoming signal (SL) from the anti-slip control system (ASC) and an incoming signal from the anti-blocking system (ABS);

processing signals, which simultaneously enter the electronic gear control (EGS) in an OR function according to established dominance, on one side, at least one of a signal (SL) from the anti-slip control system (ASC) and a signal from the anti-blocking system (ABS) demanding a gear shift; and, on the other side, a signal (SV)

from the dynamic stabilizer (DS) demanding a gear shift prevention being the most dominant signal;

issuing, via the vehicle dynamics control (FDR) to the electronic gear control (EGS), the dominant signal (SV) from the dynamic stabilizer (DS) for preventing gear shifts when the dynamic stabilizer (DS) is activated; and detecting, via the electronic gear control (EGS), the dominant signal (SV) for preventing gear shifts as one of a general shift prevention, an upshift prevention and a downshift prevention.

* * * * *